United States Patent
Hatcher et al.

(10) Patent No.: US 11,541,636 B2
(45) Date of Patent: *Jan. 3, 2023

(54) MULTILAYER COMPOSITE MATERIAL AND METHOD FOR MANUFACTURING

(71) Applicant: DSM IP ASSETS B.V., Heerlen (NL)

(72) Inventors: Wesley Edward Hatcher, Echt (NL); Christopher Michael Adams, Echt (NL)

(73) Assignee: DSM PROTECTIVE MATERIALS B.V., Geleen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/468,034

(22) PCT Filed: Dec. 21, 2017

(86) PCT No.: PCT/EP2017/084245
§ 371 (c)(1),
(2) Date: Jun. 10, 2019

(87) PCT Pub. No.: WO2018/122125
PCT Pub. Date: Jul. 5, 2018

(65) Prior Publication Data
US 2020/0009832 A1  Jan. 9, 2020

Related U.S. Application Data

(60) Provisional application No. 62/440,014, filed on Dec. 29, 2016.

(51) Int. Cl.
*B32B 9/04* (2006.01)
*B32B 5/12* (2006.01)
(Continued)

(52) U.S. Cl.
CPC ............... *B32B 9/047* (2013.01); *A41D 1/00* (2013.01); *A43B 1/02* (2013.01); *A43B 1/14* (2013.01);
(Continued)

(58) Field of Classification Search
CPC .. B32B 5/12; B32B 5/022; B32B 5/26; B32B 9/025; B32B 9/047; B32B 27/12;
(Continued)

(56) References Cited

U.S. PATENT DOCUMENTS

| 5,470,632 A | 11/1995 | Meldner et al. |
| 7,389,718 B1 | 6/2008 | Carter et al. |

(Continued)

FOREIGN PATENT DOCUMENTS

| WO | WO 2014/160483 | 10/2014 |
| WO | 2016/113637 | 7/2016 |
| WO | WO 2016/113637 | 7/2016 |

OTHER PUBLICATIONS

International Search Report for PCT/EP2017/084245, dated Feb. 20, 2018, 3 pages.
(Continued)

*Primary Examiner* — Catherine A. Simone
(74) *Attorney, Agent, or Firm* — Nixon & Vanderhye P.C.

(57) ABSTRACT

The invention relates to a structural multilayer composite comprising a layer of leather in contact with at least one monolayer comprising parallel aligned fibers and a matrix material. The composite may further comprise film layer(s) that may be breathable and/or waterproof. The structural multilayer composite material is suitable for use in clothing and outdoor gear and apparel.

17 Claims, 2 Drawing Sheets

(51) Int. Cl.
- *B32B 5/26* (2006.01)
- *B32B 9/02* (2006.01)
- *B32B 27/12* (2006.01)
- *A41D 1/00* (2018.01)
- *A43B 1/02* (2022.01)
- *A43B 1/14* (2006.01)
- *B32B 5/02* (2006.01)
- *F41H 5/04* (2006.01)

(52) U.S. Cl.
CPC ............... *B32B 5/022* (2013.01); *B32B 5/12* (2013.01); *B32B 5/26* (2013.01); *B32B 9/025* (2013.01); *B32B 27/12* (2013.01); *F41H 5/0478* (2013.01); *A41D 2500/50* (2013.01); *B32B 2260/023* (2013.01); *B32B 2260/046* (2013.01); *B32B 2262/0253* (2013.01); *B32B 2307/516* (2013.01); *B32B 2307/518* (2013.01); *B32B 2307/52* (2013.01); *B32B 2307/54* (2013.01); *B32B 2307/724* (2013.01); *B32B 2307/7265* (2013.01); *B32B 2437/00* (2013.01); *B32B 2571/02* (2013.01)

(58) Field of Classification Search
CPC ........ B32B 2260/023; B32B 2260/046; B32B 2262/0253; B32B 2307/516; B32B 2307/518; B32B 2307/52; B32B 2307/54; B32B 2307/724; B32B 2307/7265; B32B 2262/0269; B32B 2437/00; B32B 2571/02; A43B 1/02; A43B 1/14; A43B 23/0225; A43B 23/0235; A41D 1/00; A41D 31/102; A41D 31/245; A41D 2500/50; F41H 5/0478
USPC .................................. 428/113, 297.4, 298.1
See application file for complete search history.

(56) References Cited

U.S. PATENT DOCUMENTS

| | | |
|---|---|---|
| 11,040,521 B2 | 6/2021 | Hatcher et al. |
| 2003/0226286 A1* | 12/2003 | Pochatko ............. A43B 7/1465 36/110 |
| 2011/0023212 A1 | 2/2011 | Carroll et al. |
| 2014/0134378 A1* | 5/2014 | Downs ................ B29C 37/0078 428/57 |
| 2015/0282544 A1 | 10/2015 | Lankes et al. |
| 2015/0328860 A1 | 11/2015 | Van Putten et al. |

OTHER PUBLICATIONS

Written Opinion of the ISA for PCT/EP2017/084245, dated Feb. 20, 2018, 6 pages.

* cited by examiner

MULTILAYER COMPOSITE MATERIAL AND METHOD FOR MANUFACTURING

CROSS-REFERENCE TO RELATED APPLICATIONS

This application is the U.S. national phase of International Application No. PCT/EP2017/084245 filed 21 Dec. 2017, which designated the U.S. and claims priority to U.S. Application No. 62/440,014 filed 29 Dec. 2016, the entire contents of each of which are hereby incorporated by reference.

FIELD

The present invention generally relates to multilayer composite materials usable as ballistic blankets and in particular to a multilayer composite material comprising a layer of leather in contact with a monolayer of man-made fibers and methods for manufacturing same.

BACKGROUND AND SUMMARY

A ballistic blanket is part of the ballistic gear used around the world in law enforcement and in the military. Ballistic blankets find use, among other things, as coverings for bomb blast protection. Ballistic blankets have been disclosed, for example, by Carter, et al. in U.S. Pat. No. 7,389,718. This document discloses a ballistic blanket that encompasses an inner ballistic core encased in an outer housing. The inner ballistic core is covered with an inner cover. The inner ballistic core may be based on high performance fibers such as aramid or ultra-high molecular weight polyethylene ("UHMWPE"). Carter further discloses use of an aramid panel as an inner ballistic core, and that the inner cover may be made of nylon. Further, Carter teaches the outer housing may be made of fabrics, vinyl, leather or other pliable materials.

Although this document discloses products with acceptable properties, there is a continuous drive to develop further improved multilayer composite products such as ballistic blankets.

In various embodiments of the present disclosure, multilayer composite materials are described having further improvements in strength to weight ratio, reduced thickness, and additional aesthetics. In this disclosure, the product of the invention will be referred to as a structural multilayer composite material.

In general, the disclosure provides a structural multilayer composite comprising: a layer of leather; and a monolayer in contact with the layer of leather. The monolayer may comprise parallel fibers aligned in a single fiber direction along with a matrix material. The monolayer may also be referred to as a unidirectional layer. In some aspects, the multilayer composite may include one or more additional monolayers bonded thereon forming a stack of layers with the leather layer one of the outer layers. Each successive monolayer may be offset relative to an adjacent monolayer at up to 90° such that the parallel fibers in one monolayer are in a different direction relative to the parallel fibers in the adjacent layer. In this way many monolayers may be used and the fiber direction may never be repeated, or several monolayers may be offset from each other until at some point the fiber direction in a layer repeats with a monolayer further below in the stack.

Each successive monolayer may comprise parallel fibers in a matrix material. The matrix material of each of the monolayers may be of different composition or the same. In various embodiments, a multilayer composite comprising a leather layer and one or more monolayers may further comprise at least one polymeric film in contact with any one monolayer such as to form an outer layer of the composite. In this way, a stack of monolayers may comprise the core of a composite having a leather layer and a film layer as the two exposed outer layers. In various examples, one or more film layers may be waterproof/breathable film, or waterproof and non-breathable film, or any combination of moisture passive and vapor passive.

In various embodiments, fibers used in the one or more monolayers may have strength of at least 0.5 GPa. In other examples, fibers may have strength of at least at least 2.5 GPa. Fibers may comprise UHMWPE or some other synthetic fiber. For example, fibers may comprise UHMWPE fibers having an intrinsic viscosity of at least 4 dl/g.

Each of the one or more monolayers within the multilayer composite may comprise a matrix material, for example in which the fibers are coated or embedded. Examples of matrix material include polyacrylate, polymers functionalized with acrylate groups, and polyurethane. Matric material may have a stiffness of at least 3 MPa.

The fiber density in any one monolayer may be between 1 and 50 grams per square meter (g/m$^2$ or "gsm").

The present disclosure further provides a process for manufacturing a multilayer composite comprising: providing an assembly comprising a layer of leather; at least one monolayer comprising parallel aligned fibers and a matrix material; and optionally at least one polymeric film layer, the assembly having two outer surfaces, one being the layer of leather; and compressing the assembly at a pressure of at least 5 bar, preferably at a pressure of at least 6 bar, and temperature between 35 and 120° C.

During the compressing process, a cover may be disposed on one or both of the outer layers, and the cover may be removable from the multilayer composite after the compressing step. Such a cover may have a texturing, and hence the pattern or texture on the cover may be imprinted onto either or both of the outer layers of the composite.

The structural multilayer composite described herein finds use in the manufacture of footwear, sports apparel, clothing, luggage, leather goods for animals, bags and luggage, hats, jackets, wallets, purses, bags, upholstery and gloves.

DETAILED DESCRIPTION

Figure 1:
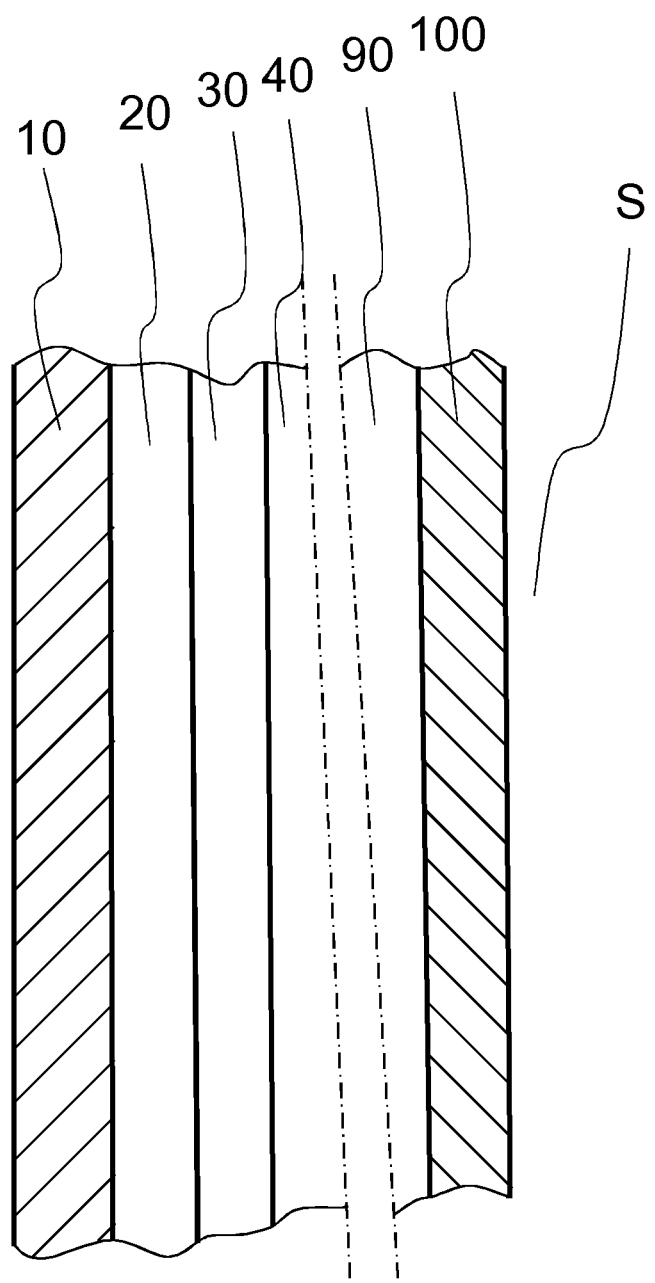
FIG. 1 depicts in cross-section an embodiment of a structural multilayer composite (S) in accordance to the present disclosure comprising: (10) a layer of leather; (20) a first monolayer; (30) an optional second monolayer; (40) an optional third monolayer; (90) an optional $n^{th}$ (4<n<8) monolayer; and (100) a film layer.
Figure 2:
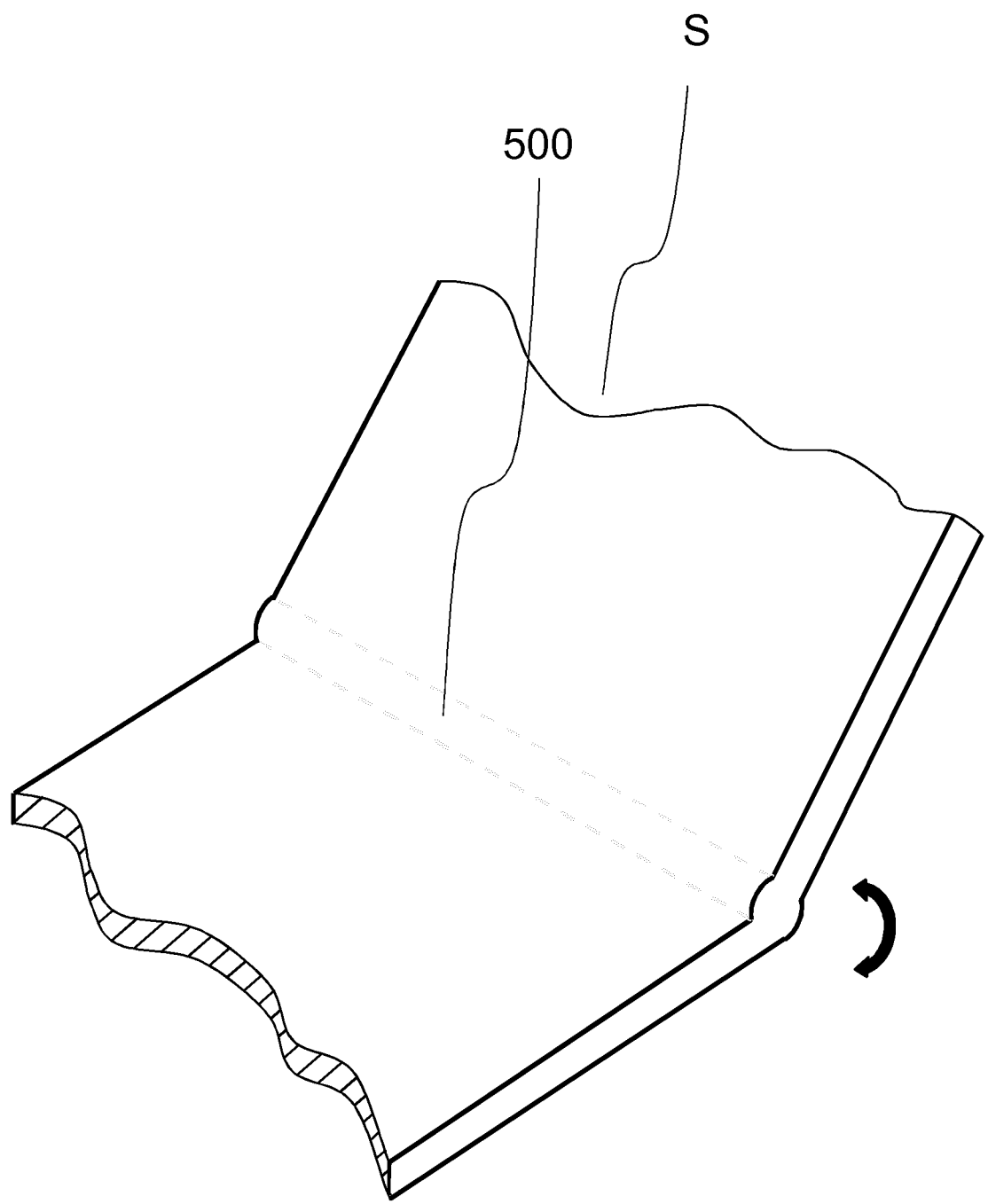
FIG. 2 depicts in perspective view an embodiment of the structural multilayer composite (S) comprising a folding line (500) created by applying a low pressure (of less than 5 bar) to the area of the folding line.

The structural multilayer composite material according to the invention comprises a layer of leather (10) in contact with a first monolayer (20), the monolayer comprising parallel aligned fibers and a matrix material. In the art such monolayer comprising parallel aligned fibers and a matrix material are also referred to as unidirectional layer. For example, a monolayer herein may comprise parallel fibers embedded in a matrix material.

Leather in the context of the present invention refers to natural leather from various animal origins, often referred to as natural origin. In an alternative embodiment of the present invention, the structural multilayer composite material of the invention comprises artificial or faux leather, instead of natural leather.

The leather for use in the structural multilayer composites herein may originate from animal rawhide, typically from cattle, and but may also be sourced from reptiles, birds or other animals. Commonly used leather types originate from cow, calf, sheep and buffalo. More exotic leathers may have fish origin, such as salmon or eel skin, or may come from, for example, snake, crocodile, alligator, kangaroo, chicken, or elephant. Natural leather includes grain leather, including full grain, top grain and nubuck (top grain cattle leather than has been sanded or buffed), and corium leather, including suede, and also (finished) split leather. The leather may have had treatment, such as, for example, tanning, coloring, conditioning, waxing, sanding, buffing, tooling or embossing. In a preferred embodiment of the present invention, the leather is embossed after or during the formation of the structural multilayer composite material of the invention. Alternatively embossing of the leather may take place before the formation of the composite. The leather may be colored via aniline, semi-aniline or pigmented techniques, and may include a top coat such a wax finish or polish.

The leather layer for use herein may be of any thickness. In various embodiments, typical thicknesses range between 0.5-6 mm. Preferably the thickness of the leather ranges from 0.7-4 mm and more preferably between 0.7-2.8 mm.

A preferred structural multilayer composite material according to the present invention comprises calf leather as the leather layer, and preferably the calf leather has a thickness between 0.7 and 2.4 mm, and more preferably between 0.7 and 1.6 mm. These thickness ranges have been found to provide the best structural multilayered composites.

Those skilled in the art will understand that the invention can also be applied in structural multilayer composite materials that comprise leather alternatives and artificial or faux leather, such as so-called ocean leather made from kelp, bark or bark cloth, cork leather typically originating from cork-oak, natural fiber based alternatives such as cellulose fiber originating from several sources such as bamboo and pineapples, mushroom based materials like MuSkin, and glazed cotton. In various examples, recycled matter may be included in these alternative leathers.

Artificial leather includes, for example, polyurethane, vinyl and acrylic based artificial leathers, and combinations thereof. Furthermore, leatherette and polyester based leather alternatives such as recycled polyester (PET) degradable polyurethane, Alcantara® and Ultrasuede® find use herein.

An advantage of the composites according to the invention over the original (faux) leather materials is an increased consistency through which products better maintain their original shape and dimensions and are less susceptible to sagging. Furthermore they are more durable, meaning that if they are bent over an edges with e.g. a low bending radius of e.g. 5 mm or less, they are able to better retain their shape.

A special preferred embodiment of the present invention relates to a composite that is based on a paper material instead of leather. This paper may be leather paper also known as parchment, but also printing paper, writing paper, drawing paper, photo paper, handmade paper, and card. The paper may have a thickness, often expressed as weight per surface area, of between 60 gram/m$^2$ and 200 gram/m$^2$ (as determined at ambient conditions of 23° C./50% RH, after first conditioning under these conditions for 24 hours), preferably between 70 gram/m$^2$ and 160 gram/m$^2$, more preferably between 80 gram/m$^2$ and 120 gram/m$^2$.

A special embodiment of paper relates to banknote paper. These often comprise cotton/linen base, but may also made of polymer, e.g. the polymer films as mentioned in this disclosure herein below. In various embodiments of the present disclosure, structural multilayer composites herein comprise banknotes. Banknotes having the structure of the multilayer composites herein are more tear resistant than ordinary banknotes, while having a crisp hand feel.

Another preferred embodiment of the present invention relates to a composite that is based on a cotton, wool or linen layer instead of leather. Cotton, wool or linen layers may be woven structures. In various embodiments, a canvas for paintings is based on such a composite. Paint in the painting on such canvass will be less susceptible to cracking over time, even after a 50-year time period or longer.

The leather layer in the structural multilayer composite may optionally be covered on its exposed side, i.e. the side opposite to the first monolayer, with a film layer as further explained below. An alternative to the film layer may be a coating or an alternative thereof, such as materials applied by vacuum deposition. A film layer over the outer leather layer may be used to give special visual appearance to the composite and for protecting the leather, e.g. against harsh outdoor conditions such as sea-salt, or against staining.

The structural multilayer composite material according to the invention comprises a first monolayer comprising parallel aligned fibers and a matrix material.

The monolayer may be obtained by orienting a plurality of fibers in parallel fashion in one plane, for instance by pulling a number of fibers or yarns from a fiber bobbin frame over a comb, and impregnating the fibers with the matrix material in a way known to the skilled person, before, during or after orienting. In this process, the fibers may have been provided with a finish with at least one component or polymer other than the plastic matrix material in order to, for instance, protect the fibers during handling or in order to obtain better adhesion of the fibers onto the plastic of the monolayer. Preferably, fibers without a finish are used. The fibers may have been surface treated before finishing or before contacting the fibers with the matrix material. Such treatment may include treatment with chemical agents such as oxidizing or etching agents, but preferably includes plasma or corona treatment.

The amount of fiber in one monolayer is generally between 1 and 50 grams per square meter. The amount of fiber may also be referred to as the fiber density of a layer. Preferably the amount of fiber in one monolayer is between 2 and 30 grams per square meter, and more preferably between 3 and 20 grams per square meter. It has been found that fiber densities in these ranges help to maintain flexibility of the structural multilayer composite material according to the present invention.

The matrix material used in the monolayer preferably comprises a thermoplastic material. Particularly suitable are those matrix materials that can be dispersed in water prior to application. Examples of suitable polymer materials include, but are not limited to, polyacrylates, polyurethanes, modified polyolefins and ethylene copolymers, including SEBS and SIS polymers, such as known in the field of ballistic resistant articles, and ethylene vinyl acetate.

Preferably, the matrix material contains a type of polyurethane. For example, the polyurethane may comprise a polyether-urethane based on a polyetherdiol, which provides good performance over a wide temperature range. In another example, the polyurethane may comprise a polyester-urethane based on a polyetherdiol, which provides good performance over a wide temperature range.

In a special embodiment, the polyurethane or polyether-urethane is based on aliphatic diisocyanates as this further improves product performance, including its color stability. The 100% modulus of these matrix materials for use in the monolayers is preferably at least 3 MPa. More preferably the 100% modulus is at least 5 MPa.

The 100% modulus is generally lower than 500 MPa.

In another preferred embodiment, a suitable alternative matrix material may be Kraton®, applied from an aqueous dispersion.

In a yet further preferred embodiment, the matrix material may comprise an acrylic based resin, or a polymer comprising acrylate groups.

Yet a further type of matrix material comprises a homopolymer or copolymer of ethylene and/or propylene, wherein the polymeric resin has a density as measured according to ISO1183 in the range from 860 to 930 kg/m$^3$, a peak melting temperature in the range from 40° to 140° C. and a heat of fusion of at least 5 J/g.

Further details of matrix systems and monolayers with unidirectional fibers may be found, for example, in U.S. Pat. No. 5,470,632, incorporated herein by reference in its entirety.

The amount of matrix material in one monolayer is typically between 10 and 95 wt %; preferably between 20 and 90 wt %, more preferably between 30 and 85 wt %, and more preferably between 35 and 80 wt %. This ensures adequate bond strength between the leather and/or monolayer(s), and other components, thereby reducing the chance for premature delamination in the composite after repeated flexural cycles.

The matrix material in second and subsequent monolayers may be the same as in the first monolayer, but also may differ. In various embodiments, a structural multilayer composite comprises a first monolayer comprising parallel fibers in a first matrix material and a second monolayer comprising parallel fibers in a second matrix material.

A used herein, term "fiber" is meant to include not only a monofilament but, inter alia, also a multifilament yarn or tapes.

Tapes may be made by various known techniques including solid state polymer processing, gel technology and fiber fusion. Tapes have a width to thickness ratio of at least 5, preferably at least 10, more preferably at least 100, and most preferably of at least 1000.

Suitable fibers for use in the structural multilayer composite material according to the invention may be carbon fibers.

Especially suitable fibers for use in the structural multilayer composite material according to the invention include, for example, fibers based on polyamides, including polyamide 6, and 6.6; and polyesters, including polyethylene terephthalate; polypropylene and polyethylene. Furthermore preferred fibers include aromatic polyamide fibers (also often referred to as aramid fibers), especially poly(p-phenylene teraphthalamide); liquid crystalline polymer and ladder-like polymer fibers such as polybenzimidazoles or polybenzoxazoles, such as poly(1,4-phenylene-2,6-benzobisoxazole) (PBO), or poly(2,6-diimidazo[4,5-b-4',5'-e]pyridinylene-1,4-(2,5-dihydroxy)phenylene) (PIPD; also referred to as M5); polyaryl ether ketones including polyether ether ketone and fibers of, for example, polyolefins, polyvinyl alcohol, and polyacrylonitrile which are highly oriented, such as obtained, for example, by a gel spinning process. Highly oriented polyolefin, aramid, PBO and PIPD fibers, or a combination of at least two thereof are preferably used. Highly oriented polyolefin fibers include polypropylene and polyethylene fibers and have a tensile strength of at least 1.5 GPa.

Of use herein are high performance polyethylene fibers, also referred to as highly drawn or oriented polyethylene fibers consisting of polyethylene filaments that have been prepared by a gel spinning process, such as described, for example, in GB 2042414 A or WO 01/73173. The advantage of these fibers is that they have very high tensile strength combined with a light weight, so that they are in particular very suitable for use in extremely thin layers. Preferably, use is made of multifilament yarns of ultra-high molar mass polyethylene with an intrinsic viscosity of at least 5 dl/g, more preferably these polyethylene yarns have an intrinsic viscosity of at least 8 dl/g.

The titer of a single filament of these fibers or yarns generally is less than 10 denier, preferably less than 5 denier, more preferably less than 3 denier, even more preferably the titer of a single filament of these fibers is less than 2 denier. This results in a better fiber distribution and therewith in a better rigidity of the structural multilayer composite material of the invention.

The fibers in the structural multilayer composite material of the invention typically have a tensile strength of at least 0.5 GPa, preferably at least 0.6 GPa, more preferably at least 0.8 GPa. In a preferred embodiment the strength of the fibers, preferably polyethylene fibers, is at least 3.0 GPa, preferably at least 3.5 GPa, more preferably at least 4.0 GPa and most preferably at least 4.5 GPa. For economic reasons the strength of the fibers is preferably less than 5.5 GPa. The fibers preferably have a tensile strength of between 3.1 and 4.9 GPa, more preferably between 3.2 and 4.7 GPa, and most preferably between 3.3 and 4.5 GPa.

The fibers in the second and subsequent monolayers may be the same as in the first monolayer, but also may differ per monolayer.

One alternative embodiment relates to an in-layer-hybrid, where at least 2 of the above-mentioned fibers are used in one and the same monolayer.

With reference to FIG. 1, a structural multilayer composite material according to the invention may further comprise a second monolayer (30) comprising parallel aligned fibers and matrix material in contact with the first monolayer (20). In a structural multilayer composite with two such monolayers having parallel fibers, the fiber direction in the second monolayer (30) may be rotated or "offset" to the fiber direction in the (adjacent) first monolayer (20), such as to a smallest angle of more than 0° and at most 90°.

For further fine tuning the properties of the structural multilayer composite material, one may decide to add a third monolayer (40) and subsequent monolayers, up to n monolayers, in contact with and rotated relative to an adjacent monolayer to offset the fiber directions. In various embodiments, the total number of monolayers, n, may be between about 4 and about 8, (4<n<8). Depending on the application, the value of n may be chosen to suit the particular application. In the structural multilayer composite material according to the invention, each monolayer may be rotated relative to a previous monolayer.

In addition to the monolayers, the structural multilayer composite material may further comprise a scrim layer. A scrim layer is a very light textile with an open weave of fibers laminated preferably into the structural multilayer composite material, that may provide extra torsion stability.

Another preferred embodiment of the present invention comprises a structural multilayered composite material, comprising a first outer layer of a first layer of leather; in contact with a first monolayer comprising parallel aligned fibers and a matrix material, at least one subsequent monolayer rotated versus the first monolayer and a second outer layer of leather. This creates a product with full leather outside, while benefitting from the properties of the composite that is present.

A preferred embodiment of the present invention comprises a structural multilayered composite material, comprising a layer of leather; in contact with a first monolayer comprising parallel aligned fibers and a matrix material, and 3 subsequent monolayers, at least one of the monolayers having less than 20 grams per square meter of fiber. Preferably at least two of the monolayers having less than 20 grams per square meter of fiber. Optionally this structural multilayered composite material has a film at the outer side, opposite to the layer of leather. The fiber direction in adjacent monolayers is rotated at a smallest angle of more than 0° and at most 90°.

With continued reference to FIG. 1, the structural multilayer composite material according to the invention may further comprise a polymeric film (100). Preferably such polymeric film is disposed in contact with the outermost monolayer on the side opposite the leather layer. In this way the layer of leather and the film layer form outer layers of the structural multilayer composite material according to the invention.

The film used may comprise, for example, a polyolefin film, including linear low-density polyethylene available under the Stamylex® trademark, polypropylene films, and polyester films.

In a preferred embodiment, the film is a biaxial stretched polyolefin film. Examples hereof are biaxial stretched high-density polyethylene and biaxial stretched polypropylene film.

Another type of film for use in the structural multilayer composite material according to the invention is a metal foil or metal coated film, a fabric or a non-woven.

In a further preferred embodiment, the polymeric film is a waterproof/breathable (W/B) film. The W/B film functions as a barrier layer that permits the transfer of gas, including water vapor, through the materials but not the transfer of liquid water. Such films include ECTFE and EPTFE branded as Gore-Tex® and eVent®, aliphatic polyurethane, aromatic polyurethane, polyamide, polyester, PVF, PEN, specially engineered with UHMWPE membranes, such as for example Solupor® membrane, and microporous polypropylene membranes.

A special embodiment of W/B film in the present invention may be in the form of a woven fabric, such fabric may be coated or (partially) impregnated with a matrix material to allow for its W/B properties.

Another special embodiment of the W/B film in the present invention may be in the form of a non-woven fabric, such fabric may be coated or (partially) impregnated with a matrix material to allow for its W/B properties. A typical example of a non-woven fabric includes a felt.

Thickness of these films generally is between 1 and 50 micrometers, and preferably between 2 and 25 micrometer.

An advantage of such (W/B) polymeric film is that it may prevent the leather from being stained on that surface and add barrier properties that the leather, monofilament and matrix layers would not otherwise have. Additionally, a film may add a texture that is softer to the touch or add abrasion resistant properties.

The structural multilayer composite material according to the invention may suitably be made by stacking the required layers of leather and monolayer(s), and the mentioned optional layers, and compress these at an absolute pressure of at least 5 bar, preferably at a pressure of at least 6 bar, and temperature between 35 and 120° C. Preferably the stacked layers are compressed between 6 and 300 bar, preferably at an absolute pressure of between 17 and 200 bar, and more preferably at an absolute pressure of between 18 and 150 bar. Compression may be suitably done in a static press, including an autoclave. In a static press, the sheets can be compressed to the shape of a final product. The percentage of the surface area of the stack compressed at high pressure in accordance to the invention determines the percentage of the final composite comprising structural multilayer material. For example, at least about 90% of the surface area of the stack may be compressed at high pressure according to the invention to yield a composite material having at least 90% consisting of structural multilayer composite material. More preferably the composite material may consist for at least 95% of its surface of structural multilayer composite material. Most preferably the composite material may consist for at least 98% of its surface of structural multilayer composite material. Compressing under these conditions is accomplished in a static press, including an autoclave. Preferably a continuous press is used in the form of a calendar or a continuous belt press. Alternatively, a continuous press may be used in the form of a calendar or a continuous belt press. After the continuous manufacturing, the composite may be cut in sheets of suitable size. The temperature during compression is preferably between 35° and 120° C. More preferably the temperature during pressing is between 40 and 100° C. and most preferably the temperature during pressing is between 45 and 90° C. This delivers composites with a boardy character, further emphasizing the structural properties of the composite. A further advantage of such a composite according to the invention is that their shape can be easily tailored. For example such a boardy sheet can be bent upwards, e.g. by bending the sheet along an edge in e.g. a V-shape, which bent sheet then retains its shape in a better way.

The compressing may also be done in such a way that certain areas, such as less than about 10% of the surface area, face a low pressure of less than 5 bar, preferably less than 4 bar, more preferably between 1.5 and 3.5 bar absolute pressure. That part of the composite material that is exposed to the said low pressures does not acquire structural properties and remains flexible instead. This creates the opportunity of introducing folding lines, patterns or hinges. Such may be beneficial in packaging materials and luggage and bags. A possible way of applying these said low pressures is by using the composite material that is first produced in e.g. continuous fashion 'on a roll' as a precursor material. This material can then be further processed according to the compressing conditions of the invention to achieve a structural multilayer composite material according to the invention. Thus in various aspects, a process for manufacturing a composite of which at least 90% is a structural multilayer composite may comprise providing an assembly comprising a layer of leather; at least one monolayer comprising parallel aligned fibers and a matrix material; and optionally at least one polymeric film layer, and stacking the assembly such that it has two outer surfaces with one outer surface the layer of leather; and compressing at least 90% of the assembly at a pressure between 6 and 300 bar and temperature between 35 and 120° C. The portion(s) of the assembly not compressed at the high pressure according to the invention may be compressed (before or after the higher-pressure compression) at the lower pressure to keep these areas flexible rather than structural. That is, the above method may further comprise compressing less than 10% of the assembly at less than 5 bar pressure. In this way, compressing certain areas at low pressure and other areas at higher pressure, in either order, a composite can be made wherein at least about 90% of the composite comprises structural composite and no more than about 10% (e.g. the remainder) of the composite comprises flexible composite. The flexible areas may be hinges or bendable areas disposed between areas of structural composite.

The time of pressure and temperature treatment varies by the intended end use and can be optimized via simple trial and error experiments. A typical time for pressing varies between 30 seconds and 30 minutes.

In a special version of the process to manufacture the structural multilayered composite material at least one of both outer surfaces of the composite is in contact with, preferably a removable, cover during the pressure and temperature treatment. The cover may be a fiberglass reinforced PTFE sheet, or may be a steel belt, in e.g. a continuous belt press, optionally with a release layer e.g. in the form of a siliconized paper.

The process to manufacture the structural multilayered composite material may comprise placing the leather layer in contact with a removable cover, the removable cover having a pattern according to a preset design for embossing or texturizing the leather surface layer of the structural multilayered composite material during its manufacture in the pressure and temperature treatment. The embossing may also take place for both outer layers of the composite according to the invention. This process yields a further improved structural multilayered composite material according to the invention, which due its texturized surface, may find its use in various application areas.

After the pressure and temperature treatment to obtain the structural multilayered composite material according to the invention, the material may be further post treated in order to achieve the properties required for the end use. Such may include e.g. flexing the composite material along a line as an alternative way for creating the earlier mentioned folding lines. Such flexing may suitably be done by bending over a narrow radius of 2-5 mm.

The structural multilayer composite according to the invention as well as the texturized structural multilayer composite according to the invention can suitably be used in the manufacture of footwear, sports apparel, clothing, luggage; leather goods for animals including saddles, bags and luggage. Furthermore in hats/jackets, wallets, purses, bags, upholstery, gloves, including sports gloves, such as baseball gloves, and the like.

Test Methods

The following are test methods as referred to herein:

The Intrinsic Viscosity (IV) of UHMWPE is determined according to ASTM D1601, at 135° C. in decalin, the dissolution time being 16 hours, with DBPC as anti-oxidant in an amount of 2 g/l solution, by extrapolating the viscosity as measured at different concentrations to zero concentration.

Tensile properties (measured at 25° C.): tensile strength (or strength), tensile modulus (or modulus) and elongation at break are defined and determined on multifilament yarns as specified in ASTM D885M, using a nominal gauge length of the fiber of 500 mm, a crosshead speed of 50%/min. On the basis of the measured stress-strain curve the modulus is determined as the gradient between 0.3 and 1% strain. For calculation of the modulus and strength, the tensile forces measured are divided by the titer, as determined by weighing 10 meters of fiber; values in GPa are calculated assuming a density of 0.97 g/cm$^3$. Tensile properties of thin films are to be measured in accordance with ISO 1184(H).

The modulus of the matrix material is to be determined according to ISO 527. The 100% modulus was determined on film strips with a length of 100 mm (free length between the clamps) and a width of 24 mm. The 100% modulus is the secant modulus measured between strains of 0% and 100%.

Heat of fusion and peak melting temperature have been measured according to standard DSC methods ASTM E 794 and ASTM E 793 respectively at a heating rate of 10K/min for the second heating curve and performed under nitrogen on a dehydrated sample.

The structural character of the composite according to the invention is determined as follows. A sheet the composite is positioned on a horizontal surface of e.g. a table, whereby 20 cm is protruding over the edge of the surface, in an unsupported way. The outer edge of the unsupported part of the composite may not bend down more than 3 centimeters, in order to qualify as a structural composite according to the invention. The test is to be done on sheets without folding lines.

The invention claimed is:

1. A composite structure having a surface which is at least 90% comprised of a structural multilayer composite, wherein the structural multilayer composite comprises:
   a first monolayer which is comprised of (i) parallel ultrahigh molecular weight polyethylene (UHMWPE) fibers aligned in a first fiber direction and (ii) a first matrix material, and
   a layer of leather having a thickness in a range of 0.5-6 mm in contact with the first monolayer, wherein
   the fibers are present in the first monolayer in an amount to provide a fiber density of between 2 and 30 grams per square meter.

2. The composite structure of claim 1, wherein the multilayer composite further comprises:
   a second monolayer in contact with the first monolayer, wherein the second monolayer comprises parallel fibers aligned in a second fiber direction and a second matrix material, and wherein
   the first monolayer is rotated relative to the second monolayer in the multilayer composite such that the second fiber direction is offset relative to the first fiber direction by up to 90 degrees.

3. The composite structure of claim 2, wherein the multilayer composite further comprises:
   additional monolayers of parallel fibers, wherein
   each of the additional monolayers comprises parallel fibers and a further matrix material, and wherein
   the additional monolayers are stacked and arranged in the multilayer composite such that one monolayer of the additional monolayers is in contact with the second monolayer and each successive monolayer of the additional monolayers is rotated relative to an adjacent monolayer such that fiber directions thereof are offset relative to one another.

4. The composite structure of claim 1, further comprising a polymeric film in contact with a monolayer so that the polymeric film is present as an outer layer of the composite structure.

5. The composite structure of claim 4, wherein the polymeric film is waterproof/breathable.

6. The composite structure of claim 1, wherein the UHMWPE fibers have a strength which is at least 0.5 GPa.

7. The composite structure of claim 6, wherein the strength of the UHMWPE fibers is at least 2.5 GPa.

8. The composite structure of claim 1, wherein the UHMWPE fibers have an intrinsic viscosity of at least 5 dl/g.

9. The composite structure of claim 3, wherein at least one of the first, second and further matrix materials has a stiffness of at least 3 MPa.

10. The composite structure of claim 9, wherein at least one of the first, second and further matrix materials is at least one material selected from the group consisting of polyacrylates, polymers functionalized with acrylate groups, and polyurethanes.

11. The composite structure of claim 3, wherein any one of the second and additional monolayers has a fiber density which is between 3 and 20 grams per square meter.

12. The composite structure according to claim 1, wherein the UHMWPE fibers consist of ultrahigh molecular weight polyethylene filaments in which a single one of the filaments has a titer which is less than 10 denier.

13. The composite structure according to claim 1, wherein the thickness of the leather layer is in the range of 0.7-2.8 mm.

14. A process for manufacturing the composite structure according to claim 1, wherein the method comprises:

(i) providing an assembly comprised of the layer of leather, the first monolayer comprised of the parallel aligned UHMWPE fibers, the first matrix material, and optionally at least one polymeric film layer such that the assembly has two outer surfaces, one of the outer surfaces being the layer of leather; and thereafter (ii) compressing at least 90% of the assembly at a pressure between 6 and 300 bar and temperature between 35 and 120° C. to thereby form the structural multilayer composite.

15. The process according to claim 14, further comprising compressing less than 10% of the assembly at a pressure of less than 5 bar, thereby producing the composite structure having a surface which is at least 90% comprised of the structural multilayer composite and less than 10% comprised of a flexible composite.

16. The process according to claim 14, wherein step (ii) comprises contacting at least one of the outer surfaces of the assembly with a cover during the compressing, and thereafter optionally removing the cover therefrom.

17. A product which comprises the composite structure according to claim 1, wherein the product is selected from the group consisting of footwear, sports apparel, clothing, luggage, leather goods for animals, bags and luggage, hats, jackets, wallets, purses, bags, upholstery and gloves.

* * * * *